US010068508B2

(12) United States Patent
Nagarajan et al.

(10) Patent No.: US 10,068,508 B2
(45) Date of Patent: Sep. 4, 2018

(54) MEASURING USER INTERFACE PERFORMANCE CONSISTENCY

(71) Applicant: Google Inc., Mountain View, CA (US)

(72) Inventors: Guru Nagarajan, San Jose, CA (US); Stuart Murray Scott, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1250 days.

(21) Appl. No.: 14/014,427

(22) Filed: Aug. 30, 2013

(65) Prior Publication Data

US 2015/0066433 A1 Mar. 5, 2015

(51) Int. Cl.
*G06F 11/34* (2006.01)
*G06F 3/14* (2006.01)
*G09G 3/00* (2006.01)

(52) U.S. Cl.
CPC .............. *G09G 3/006* (2013.01); *G06F 3/14* (2013.01); *G06F 11/34* (2013.01); *G09G 2330/12* (2013.01); *G09G 2340/0435* (2013.01)

(58) Field of Classification Search
CPC ......... G06T 13/00; H04L 67/02; G06F 15/16; A63F 13/00; G06K 9/64
USPC .......... 382/219, 278; 345/522, 474; 709/231
See application file for complete search history.

(56) References Cited

U.S. PATENT DOCUMENTS

| 8,456,531 B2 | 6/2013 | Walker |
| 2006/0150071 A1 | 7/2006 | Chen et al. |
| 2007/0237419 A1* | 10/2007 | Shechtman ........ G06K 9/00335 382/278 |
| 2009/0169176 A1 | 7/2009 | Thornburg et al. |
| 2011/0096077 A1 | 4/2011 | Jarrett et al. |
| 2012/0044251 A1* | 2/2012 | Mark ..................... G06F 3/0485 345/474 |
| 2012/0081377 A1* | 4/2012 | Sowerby ............. G06F 11/3612 345/522 |
| 2013/0111056 A1* | 5/2013 | Prasad ............. H04N 21/44209 709/231 |
| 2013/0121599 A1* | 5/2013 | Shmouely ............... H04L 67/02 382/219 |

FOREIGN PATENT DOCUMENTS

EP 2584462 A1 4/2013

OTHER PUBLICATIONS

Liu, Tao et al.,"Real-Time Video Quality Monitoring for Mobile Devices", Dialogic Research, Inc., Eatontown, NJ, 2010.

(Continued)

*Primary Examiner* — Regis Betsch
*Assistant Examiner* — Kaleria Knox
(74) *Attorney, Agent, or Firm* — Shumaker & Sieffert, P.A.

(57) ABSTRACT

Systems and techniques are provided for measuring consistency of animation and/or video rendering on a device, and providing a user with an indication of one or more consistency scores of the user's device. The consistency score indicates generally the consistency of user experience that is expected for the user device. In some cases, the consistency score is calculated based upon the differences in rendering times between adjacent frames in an animation, and/or the number of frames that have a render difference that differs from a standard or baseline value. A consistency score also may be based upon the framerate achievable by the device when rendering a video at a constant quality.

18 Claims, 3 Drawing Sheets

(56) References Cited

OTHER PUBLICATIONS

Mallik, Arindam et al.,"PICSEL: Measuring User-Perceived Performance to Control Dynamic Frequency Scaling", ASPLOS 2008, Mar. 1-5, 2008, Seattle, WA, USA, 2008.
Noble, Brian et al.,"Agile Application-Aware Adaptation for Mobility", 16th ACM Symposium on Operating System Principles, 1997.
International Search Report, dated Mar. 27, 2015 in corresponding International Application No. PCT/US2014/052967.

\* cited by examiner

MEASURING USER INTERFACE PERFORMANCE CONSISTENCY

BACKGROUND

Computing device manufacturers often provide multiple devices with a range of hardware and software capabilities, specifications, and customizations. Each device may have different CPU, GPU, and other architectures. The range of devices provided may be particularly diverse in the mobile space, where a single manufacturer may provide multiple versions of a single device, or a line of devices having similar or related hardware. For example, a cellular device manufacturer may provide a series of devices that have nearly identical hardware, but with minor differences depending on the specific architecture and carrier with which the cellular device will be operating. Similarly, the device manufacturer may provide multiple versions of a single-branded device with different hardware capabilities, such as to provide devices at a range of prices or features.

Computing devices also may access a variety of software through a common platform. For example, mobile devices such as smartphones, tables, and the like may access software applications via an application store. Application stores often have various mechanisms to verify that devices are compatible with the software provided by the store. However, within a set of compatible devices there may be wide variations from a performance standpoint. The wide variations in performance may make it difficult for application and content developers to provide a consistent user experience. There also may be no easy way for an end user to determine the likely performance of a specific device owned by the user, and thus the potential quality of the user experience of digital content on the device.

BRIEF SUMMARY

According to an embodiment of the disclosed subject matter, a plurality of render times may be obtained, each of which indicates the time elapsed time between rendering of corresponding adjacent frames in a graphical display rendered by a first type of computing device, where the graphical display comprises a plurality of frames. A consistency score may be determined based upon the plurality of render times, and provided to a user of the first type of computing device. During rendering of the graphical display a plurality of timestamps may be received, each of which corresponds to one of the plurality of frames in the graphical display. The render times may then be derived from the plurality of timestamps. A testing application may be executed on the first type of device, which causes the first type of device to render the graphical display. The testing application also may cause the first type of device to operate at a threshold workload prior to obtaining the plurality of rendering times.

The graphical display may include, for example, an animation rendered by the first type of computing device, such as a user interface transition, a portion of a game or other application, a scroll or other movement of a document in an application on the device, or the like, and/or a video rendered by the first type of computing device.

The consistency score may be determined based on the number of render times that deviate from a constant value, the number of render times that are not within a threshold of a constant value, a framerate of the video rendered by the first type of computing device based upon the plurality of render times, or the like. For example, a framerate of video playback by the first type of device may be determined, and a video consistency score generated based upon the framerate.

A graphics consistency score, video consistency score, and/or a combined consistency score may be provided to a user. Each score may be provided in response to a request received from the user, which is related to a computer-executable application configured to render an animation, play a video, or a combination thereof, after which the corresponding consistency score or scores may be provided to the user.

The disclosed subject matter may provide efficient mechanisms to notify a user of the expected performance of an application on the user's device, such as a mobile device. Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

It may be desirable to provide test techniques and systems that can predict how a particular device will perform when executing an application or a type of application. For example, it may be useful to provide a mobile device user with an indication of how well a particular application will perform on his device, prior to the user purchasing the application through an application store. As a specific example, a user may be interested in purchasing a video playback application on his smartphone. The application may provide video in multiple qualities or resolutions, or there may be multiple versions of the application available that provide video in different qualities, such as high definition (HD) and standard definition (SD). The user may not know prior to purchasing an application whether or not his particular device is capable of rendering HD video without interruptions such as stuttering, excessive buffering, or the like. Thus, it may be desirable to provide the user with an easy-to-understand indication of how well the application may perform when rendering HD video, and/or when executing an application designed to provide HD-quality video.

Embodiments of the disclosed subject matter may address this need by testing a device or type of device and assigning one or more consistency scores to the device. These scores may then be provided to the user prior to the user purchasing an application, so that the user can readily determine an expected performance level for his device when executing the application.

In an embodiment, inconsistent frame latency during an animation and/or the quality of video playback may be measured while the animation or video is being rendered by a device. The measurements across the vectors of frame latency and video playback quality may provide an aggregate indicator of the potential quality of the user experience for consuming digital content on the device. Digital content may include, for example, applications, games, videos, and music. An animation may include a pre-made animation, such as an animation of a scene within a game, or it may include user interface changes, such as a menu appearing, the scroll of a webpage in response to a user input, changing from one screen or application to another, or the like.

Figure 1:
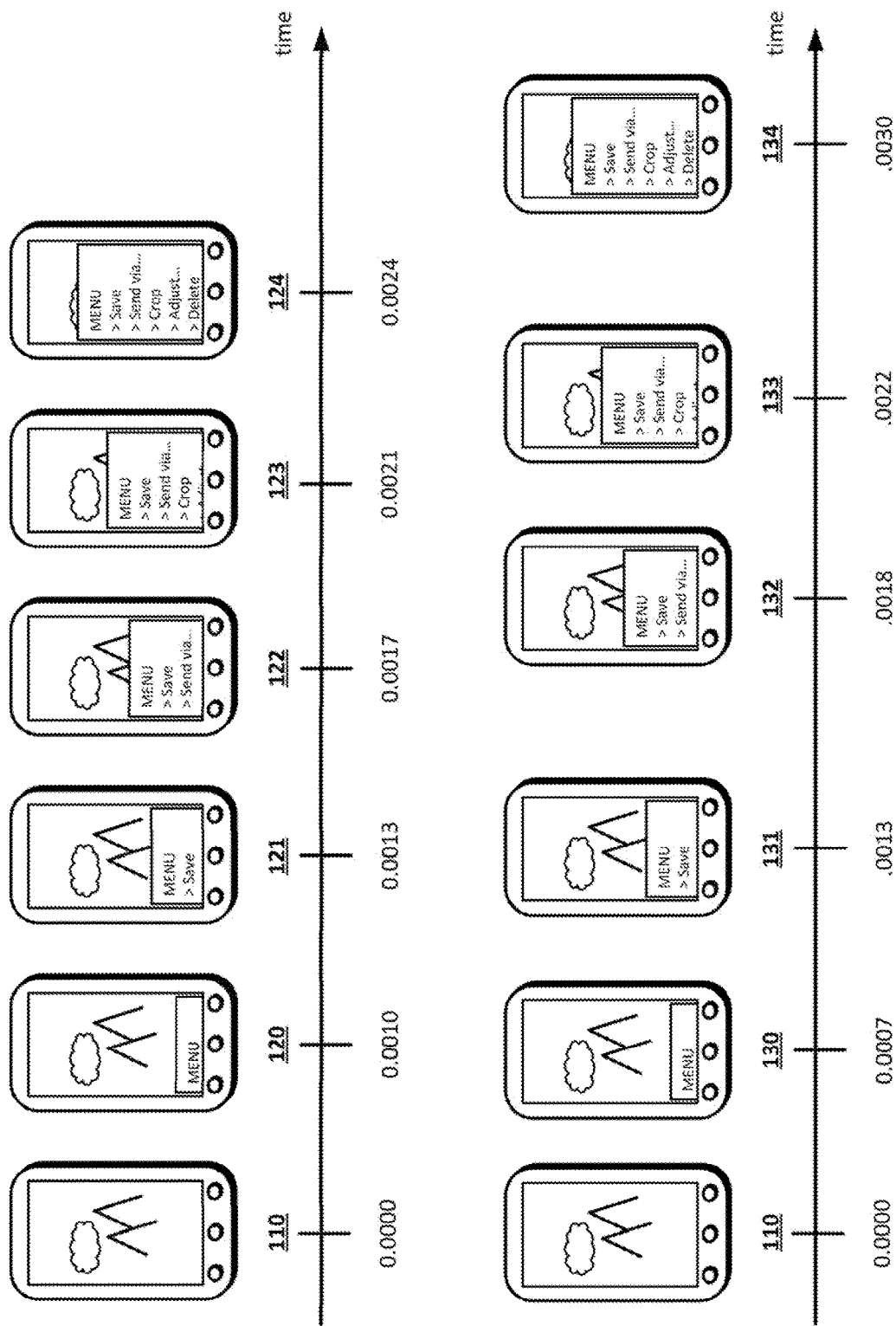
FIG. 1 shows an example set of frames for an illustrative animation of a menu appearing on two devices and associated timing according to an embodiment of the disclosed subject matter.

FIG. 1 shows an example set of frames for an illustrative animation of a menu appearing on two devices and the associated timing for each device according to an embodiment of the disclosed subject matter. At an initial time 110, a user may select a user interface element on a first device 101, after which an application executing on the device may display an animation of the menu appearing on the device. In a testing process and system, the user selection may be simulated, such as by testing software that is designed to perform or mimic actions that would be taken by a user interacting with the same application. At each time thereafter 120-124, a frame of the animation is rendered by the device. The time difference between rendering of sequential frames may be measured, for example by comparing timestamps taken when each frame rendering is completed. Although illustrated in FIG. 1 using only 5 frames for clarity, it will be understood that the techniques and systems disclosed herein may be applied to any number of frames, and that a common animation on a computing device as disclosed herein often will include many more frames than are shown to illustrate the various processes and systems disclosed herein. Similarly, the same operation and animation may be executed on a second device, which renders frames at different times 130-134 than the first device. By comparing the differences in timestamps of adjacent frames, a consistency score may be calculated.

For example, the devices illustrated in FIG. 1 may have the following timestamp differences:

| Transition | Difference |
|---|---|
| First Device | |
| 120 to 121 | .0003 |
| 121 to 122 | .0004 |
| 122 to 123 | .0004 |
| 123 to 124 | .0003 |
| Average | .00035 |
| Second Device | |
| 130 to 131 | .0006 |
| 131 to 132 | .0005 |
| 132 to 133 | .0004 |
| 133 to 134 | .0008 |
| Average | .000575 |

From this, it may be determined that the first device exhibits a higher performance when rendering animations, because the render times between adjacent frames are more consistent, and/or because the average difference in render times is lower. As described in further detail below, the consistency measurement may be used to generate a consistency score that can indicate to a user the expected performance of the user's device during normal operation.

As another example, a test system may collect frame render data from a device, such as via a service running on the device while one or more other applications is executed by the device. The service may collect time stamps in sets of a certain number, such as for 128 frames, 256 frames, or the like, and analyze the time stamps to determine the time difference between rendering of each pair of adjacent frames. A constant time difference between adjacent frames typically indicates a device that will provide a consistent user experience. The number of frames for which there is a difference in the time rendering may be determined, and this aggregate value may provide the user consistency score. Thus, in this example, a higher score indicates a less-consistent user experience, as it indicates a higher number of frames for which there was a difference in rendering time. That is, in general a higher frame latency indicates a less consistent user experience is expected for the device. A score may be determined for a variety of use cases such as using a web browser, scrolling, and a graphics application such as a game or rendered animation. Referring again to the illustrative device data above, the first device may be considered to have two time differences of 0.0004 that deviate from a constant value, with the lowest difference 0.0003 being considered the "standard." Alternatively, time differences may be considered to be the same if they are within a threshold of each other, such as 0.0001 in the example. In this case, the first device would have no deviations in rendering time differences, and it would be determined that the first device would provide a consistent user experience. Similarly, the second device may be determined to have three render time differences that deviate from the "standard" of 0.0004, which would indicate a less consistent user experience. If a threshold of 0.0001 is applied, the second device may be considered to have two render time differences that deviate from the standard. In each case, it may be determined that the second device will provide a less-consistent user experience than the first device.

A similar consistency score may be calculated for video playback, in addition to or instead of the graphics consistency score. In an embodiment, video encoding and/or decoding times for a device may be measured at a particular resolution and/or bitrate. The framerate provided by the device while the quality of the video being encoded or decoded is held constant may provide a video consistency score that indicates the consistency of a user experience that can be expected for the device during video playback. For example, a device may be intended to support HD video. A system as disclosed herein may play an HD video on the device at, for example, a constant 2 MB/s. The framerate achieved by the device may indicate the expected user consistency. For example, if the device is able to play 24 frames each second, it may be determined that the device is capable of playing HD video at a quality that provides a consistent user experience. Similarly, if the device is only able to play 18 frames per second while the quality is held constant, it may be determined that the device is not able to provide as consistent a user experience, or that the device is not capable of displaying HD video.

Consistency scores may be derived from the frame latency and video playback data, such as by determining a range into which this data falls and assigning a corresponding consistency score. For example, a set number of frames may be analyzed, such as 128. A consistency score between 0 and 5 may be assigned based upon the number of frames that have a render time that differs from a constant time by more than a threshold amount. As a specific example, a consistency score of 5 may be assigned if there are 0-10 such frames, 4 if there are 11-20, 3 if 21-30, 2 if 31-40, 1 if 41-50, and 0 if there are 51 or more such frames. Alternatively or in addition, if a number of frames over another threshold have an inconsistent render time, the device may be considered to provide an inconsistent user experience. Similar ranges and thresholds may be used for video playback. For example, consistency scores of 5, 4, and 3 may be assigned for framerates of 24, 20, and 16 frames per second, respectively. The example thresholds and scores disclosed herein are illustrative only, and more generally any ranges and thresholds may be used as determined by a test system, application store, or the like. The consistency scores may be provided to a user, such as a user accessing an application store via the device. The consistency score may be provided as a single number, a visual indicator such as a star rating, or the like. In some cases, either a graphics consistency score or a video consistency score may be provided, depending upon the specific application being considered by the user. Alternatively or in addition, a graphics consistency score and a video consistency score may be combined to provide a composite consistency score that is associated with the device. For example, the graphics consistency score and the video consistency score may be averaged, summed, or otherwise combined to generate a single score. In some cases, the graphics and video consistency scores may be weighted, such as where the graphics consistency score is a value in the range 1-4 and the video consistency score is a value in the range 0-1 (i.e., only designating a consistent or inconsistent user experience), and the two are added to produce a consistency score in the range 1-5.

Figure 2:
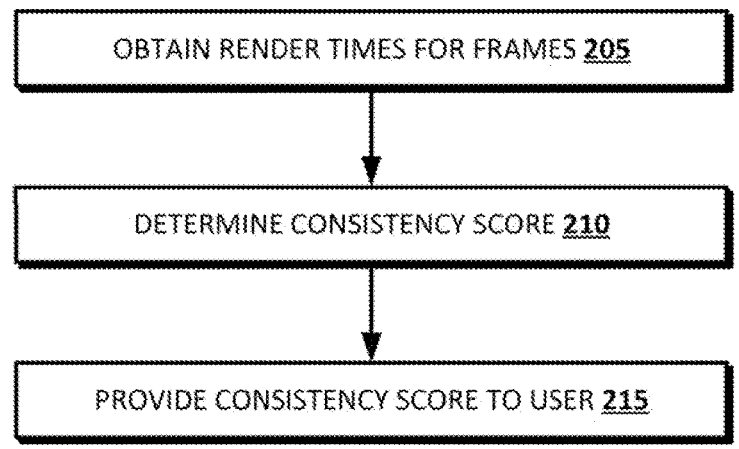
FIG. 2 shows an example process according to an embodiment of the disclosed subject matter.

FIG. 2 shows an example process according to an embodiment of the disclosed subject matter. At 205, a plurality of render times may be obtained. As previously described, each of the plurality of render times indicates the time elapsed time between rendering of corresponding adjacent frames in a graphical display rendered by a first type of computing device, which includes multiple frames. The graphical display may be an animation or video rendered by a device. For example, the render times may be the difference between timestamps of adjacent frames in an animation or video. Similarly, the render times may be equal to the framerate of a rendered video that is played by the device at a constant quality. The type of device may be, for example, a specific model and version of computing device, such as a specific model of a smartphone, tablet, or the like, which may include a specific version of operating system or other software. The render times may be obtained, for example, by executing a testing application on a specific instance of the type of device, i.e., a single individual device of the model of interest. It may be presumed that the render times are an accurate representation of render times that would be obtained for any individual device of that particular model, since generally any device of the same model will have identical or nearly identical hardware and software.

To obtain the render times, timestamps for individual frames may be recorded while the device is rendering the graphical display. From these timestamps, the render times may be derived as the difference between adjacent timestamps. The timestamps may be obtained based upon, for example, a testing application executing on the device, which monitors rendering of the graphical display and records the individual timestamps. The testing application also may cause the device to execute an application that renders the graphical display.

In some cases, the testing application may cause the device first to operate above a minimum threshold workload, prior to monitoring rendering of a graphical display. For example, one or more services and/or other processes may be executed on the device, and the testing application may take measurements while the processes are executing. Such a configuration may be useful to simulate actual use of the device by a user under normal operating conditions. Often a user will have multiple applications installed and/or executing on the device, or may be performing multiple operations on a device. Thus, causing the device to operate at a minimum workload prior to measuring the render times of animation frames may cause any resulting consistency score to be a more accurate representation of the consistency that a user may expect during routine operation of a device.

At 210, a consistency score may be determined based upon the render times. As previously described, the consistency score generally may indicate the degree of consistency that may be expected for a user's experience when using the type of device. The consistency score may be based upon, for example, the number of frames in an animation that deviate from a constant value, the average render time of adjacent animation frames, the framerate of a played video, or combinations thereof as previously described.

The consistency score may be provided to a user at 215. For example, a user may access an application store via a mobile device of the type for which consistency scores were generated. The application store may provide a consistency score to the user, either generally in association with the user's device, or in response to a request related to a specific application. The user may select an application to be viewed, opened, installed, or otherwise accessed by the user's device. In response, the application store may provide an indication of the consistency score to the user. In some cases, the application store may provide one or more consistency scores with each listing of an application within the store, where the consistency score(s) are based upon the device that accesses the application store. Further, the application store may use the consistency score(s) to determine which applications should be shown to the user. For example, if a user's device has a consistency score that indicates a particular application will perform at a relatively very low consistency on the user's device, the application store may not display that application as an option for the user to download and/or install on the user's device. Alternatively, if the user's device has one or more consistency scores that fall below a threshold, the application store may present a warning to the user indicating that a particular application may not provide a consistent user experience on the user's device.

For example, a user may select an application within an application store accessed via the device. The application store may then provide an information screen to the device, which includes information such as the application name, developer, install size, description, and the like. In addition, the application store may provide an indication of the consistency score, such as by displaying a star rating assigned to the device. The specific consistency score provided may be specific to the type of device used to access the store. It also may be based upon the application and/or the type of application accessed by the user. For example, if the application is a video playback application, the application store may provide an indication of the video consistency score. The application also may provide an indication of a composite consistency score, which may or may not be provided in association with a specific application.

Figure 3:
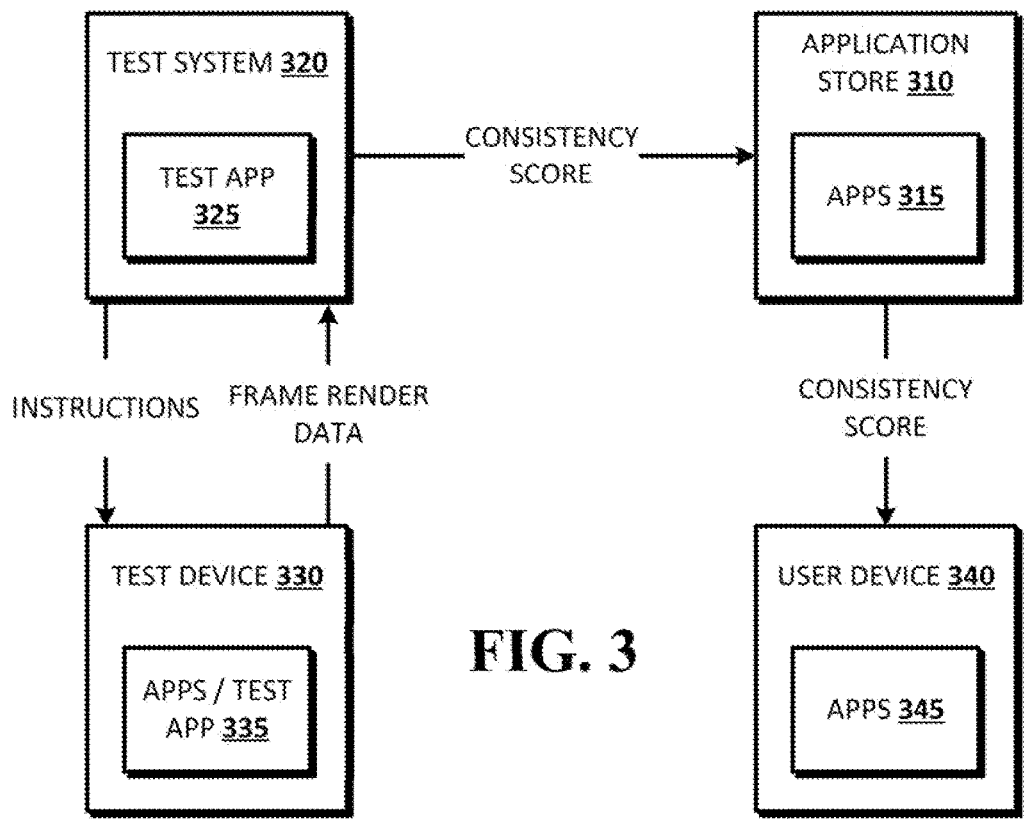
FIG. 3 shows an example arrangement according to an embodiment of the disclosed subject matter.

FIG. 3 shows an example arrangement according to an embodiment of the disclosed subject matter. The arrangement includes a test system 320 and/or test device 330. The test system 320 may be separate from and in communication with the test device 330, or it may be implemented directly on the test device 330. A test application 325 may be used to instruct the test device 330, such as to execute a test application 335 and/or one or more other applications 335 installed on the device. Frame render data may be collected by the test system 320 and/or the test application 325/335.

Based upon the frame render data collected by the test system 320, a consistency score may be generated as previously described and provided to an application store 310 that can provide one or more applications 315 to user devices. As previously described, the consistency score may be provided to a user device 340 on which one or more applications 345 are, or may be, installed. Typically, the user device 340 is the same type as the test device 330, so that the consistency score provides an accurate representation of the expected consistency of the user experience on the user device 340.

Embodiments of the presently disclosed subject matter may allow a user to readily determine if his device is capable of providing a consistent user experience when executing various applications. Embodiments also may provide techniques for device providers to improve the consistency of the user experience on a specific device or range of devices. For example, many devices may implement various performance and power optimizations, such as where mobile devices use a governor to regulate the CPU frequency, capacity, maximum clock frequency, and the like. The governor also determines how, and for how long the CPU responds to user interaction and, therefore, determines the power consumption of the device. There are numerous approaches to tuning a governor, which may impact the user experience on the mobile device. However, because embodiments of the present disclosure measure and rate the consistency of the end user experience, CPU and/or device manufacturers may be able to improve or differentiate their products by optimizing the CPU and/or related architecture based on the desired user experience. Similarly, embodiments disclosed herein may provide and end user with a simple indicator to determine the expected quality of their user experience.

Embodiments of the present disclosure also may encourage hardware providers to tune devices to provide a consistent user experience. Some conventional testing and benchmarking techniques may use known programmatic routines or tests to generate a performance score. Thus, device and software providers may be motivated to tune devices and software to operate differently when these tests are performed, and/or to be tuned based on the requirements of these tests, as opposed to more realistic operating conditions that may be experienced by users. In contrast, techniques and systems as disclosed herein may test the performance of a device when rendering different types of graphical interfaces, under conditions that are similar or identical to those that may be experienced by a user during regular operation of the device. Thus, if device providers tune devices to perform well when subjected to the tests disclosed herein, the devices also may perform well during regular operation and thus provide a more consistent user experience than may otherwise be achieved.

Figure 4:
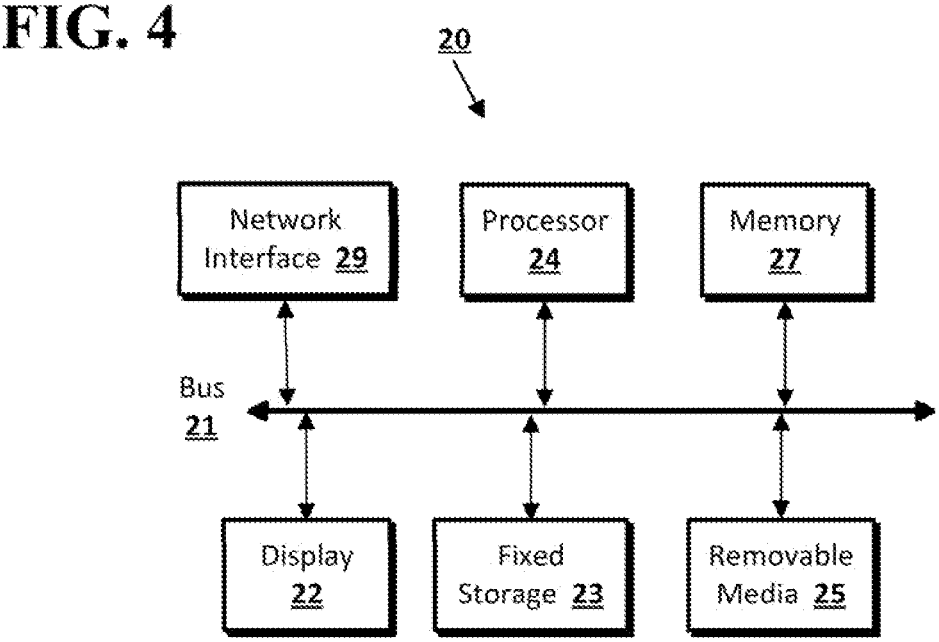
FIG. 4 shows a schematic representation of an example computing device suitable for implementing embodiments of the presently disclosed subject matter.

Embodiments of the presently disclosed subject matter may be implemented in and used with a variety of component and network architectures. FIG. 4 is an example computing device 20, such as a smartphone, pad computer, or the like, which is suitable for implementing embodiments of the presently disclosed subject matter. The computing device 20 includes a bus 21 which interconnects major components of the device 20, such as a central processor 24; a memory 27 (typically RAM, but which may also include ROM, flash RAM, or the like); a user display 22, which may include a touchscreen or other user interface; a fixed storage 23, such as a hard drive, flash storage, or other solid-state storage, and the like, and a removable media component 25 operative to control and receive a flash drive, memory card, or the like.

The bus 21 allows data communication between the central processor 24 and the memory 27. The memory is generally the main memory into which the operating system and application programs are loaded. Applications resident with the computer 20 are generally stored on and accessed via a computer readable medium, such as the fixed storage 23 or other storage medium 25.

The fixed storage 23 may be integral with the computing device 20 or may be separate and accessed through other interfaces, such as a cloud-based interface. A network interface 29 may provide a direct connection to a remote server via a direct or indirect network link including a digital cellular telephone connection, a wireless LAN or other network connection, a digital satellite data connection, or the like. For example, the network interface 29 may allow the computer to communicate with other computers via one or more local, wide-area, or other networks, as shown in FIG. 5.

Many other devices or components (not shown) may be connected in a similar manner. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
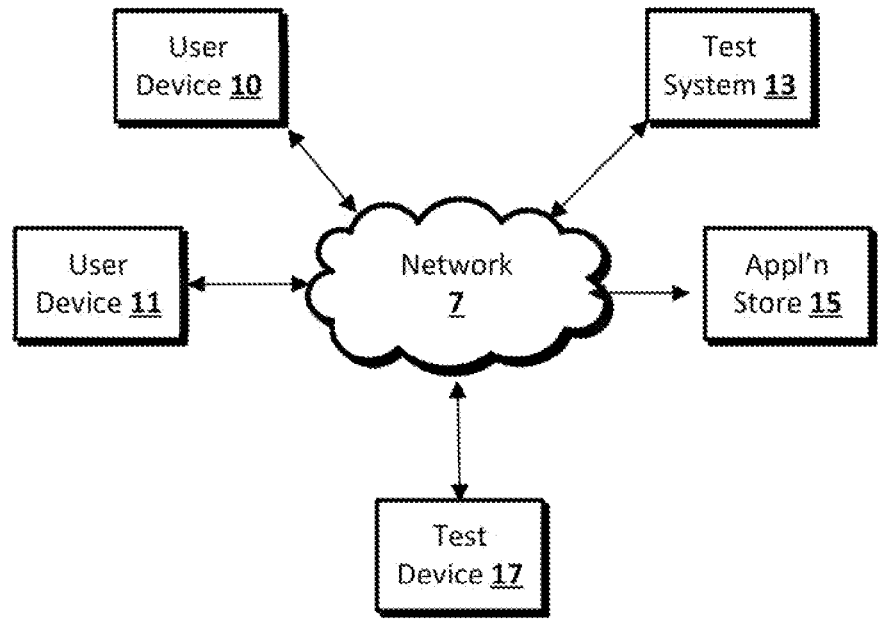
FIG. 5 shows an example network arrangement according to an embodiment of the disclosed subject matter.

FIG. 5 shows an example network arrangement according to an embodiment of the disclosed subject matter. One or more user devices 10, 11, such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. As disclosed herein, the user devices 10, 11 may connect to a remote application store 15 or other similar service, which may be implemented on one or more servers, provided as a cloud-based service, or the like. A test system 13 also may communicate with a test device 17 to perform the tests disclosed herein, and/or an application store 15 to provide consistency scores as disclosed herein. One or more of the test device, test system, and/or application store also may be located locally, and thus may not need to communicate via a wide-area network. For example, the test system 13 and test device 17 may be located locally to one another, or may be implemented as a single system, such as where the test system 13 is implemented as an application that is executed on the test device 17. Similarly, the test system 13 may communicate with the application store 15 over a separate communication channel, such as a secure connection, VPN, local network, or the like.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, CD-ROMs, DVDs, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for predicting how well a particular type of device will perform when executing an application, the method comprising:
obtaining, using a test system device, a plurality of time measurements indicating respective elapsed times between rendering of a plurality of corresponding adjacent frames, wherein the corresponding adjacent frames are rendered by a device of the particular type and are depicted by a display which is a part of the device;
determining, by the test system, a number of time measurements from the plurality of time measurements that are not within a threshold of a constant value;
determining, by the test system device and based on the number of time measurements, a consistency score for the particular type of device, the consistency score being indicative of a predicted performance level for the particular type of device while executing the application;
receiving, from a user device of the particular type, a request for the application; and
responsive to receiving the request for the application and prior to the application being installed at the user device, outputting, for display by the user device, an indication of the consistency score and an indication of the application.

2. The method of claim 1, wherein obtaining the plurality of time measurements comprises:
recording, during the rendering of the plurality of corresponding adjacent frames by the device of the particular type, a plurality of corresponding timestamps; and
determining, based on the plurality of corresponding time stamps, the plurality of time measurements.

3. The method of claim 2, further comprising;
causing the device of the particular type to execute a testing application, wherein the testing application causes the device of the particular type to render the plurality of corresponding adjacent frames.

4. The method of claim 3, wherein the testing application further causes the device of the particular type to operate at a threshold workload while rendering the plurality of corresponding adjacent frames.

5. The method of claim 1, wherein the plurality of corresponding adjacent frames is an animation.

6. The method of claim 5, wherein the determining the consistency score further comprises determining the number of time measurements which deviate from the constant value.

7. The method of claim 1, wherein the plurality of corresponding adjacent frames is a video.

8. The method of claim 7, wherein determining the consistency score further comprises:
determining, based upon the plurality of time measurements, a framerate of the video rendered by the device of the particular type; and
determining the consistency score based on the framerate.

9. The method of claim 1, further comprising:
measuring a framerate of video playback, by the device of the particular type, of a video; and
determining, based upon the framerate, a video consistency score.

10. The method of claim 9, further comprising:
responsive to receiving the request for the application, determining that the application is configured to play the video; and
responsive to determining that the application is configured to play the video, providing the video consistency score to the user.

11. The method of claim 5, further comprising:
responsive to receiving the request for the application, determining that the application is configured to generate the animation; and responsive to determining that the application is configured to play the animation, providing the consistency score to the user.

12. The method of claim 9, wherein the consistency score is further based upon the video consistency score.

13. An apparatus, comprising:
a test system device configured to:
obtain a plurality of time measurements indicating respective elapsed times between rendering of a plurality of corresponding adjacent frames, wherein the corresponding adjacent frames are rendered by a device of the particular type and are depicted by a display which is a part of the device;
determine a number of time measurements from the plurality of time measurements that are not within a threshold of a constant value;
determine, based on the number of time measurements, a consistency score for the particular type of device, the consistency score being indicative of a predicted performance level for the particular type of device while executing a particular application;
receive, from a user device of the particular type, a request for the particular application; and
responsive to receiving the request for the application and prior to the particular application being installed at the user device, output, for display by the user device, an indication of the consistency score and an indication of the particular application.

14. A non-transitory computer-readable medium, comprising:
processor-executable instructions stored thereon and configured to cause a processor to become a special-purpose device configured to:
obtain, using a test system device, a plurality of time measurements indicating respective elapsed times between rendering of a plurality of corresponding adjacent frames, wherein the corresponding adjacent frames are rendered by a device of the particular type and are depicted by a display which is a part of the device;
determine a number of time measurements from the plurality of time measurements that are not within a threshold of a constant value;
determine, based on the number of time measurements, a consistency score for the particular type of device, the consistency score being indicative of a predicted performance level for the particular type of device while executing a particular application;
receive, from a user device of the particular type, a request for the particular application; and
responsive to receiving the request for the application and prior to the particular application being installed at the user device, output, for display by the user device, an indication of the consistency score and an indication of the particular application.

15. The method of claim 1, further comprising:
responsive to receiving the request for the application, determining, based on the consistency score, whether to include the application as an option for installation at the user device, wherein the application is included if the consistency score satisfies a threshold and is not included if the consistency score does not satisfy the threshold, and wherein the application is not included if the consistency score does not satisfy the threshold, wherein outputting the indication of the consistency score and the indication of the application is in response to determining that the consistency score satisfies the threshold.

16. The method of claim 1, wherein the consistency score and the number of time measurements that are not within the threshold of the constant value are inversely related.

17. The apparatus of claim 13, wherein the test system device is further configured to obtain the plurality of time measurements by at least being configured to:
cause the device of the particular type to execute a testing application, wherein the testing application causes the device of the particular type to render the plurality of corresponding adjacent frames and to operate at a threshold workload while rendering the plurality of corresponding adjacent frames;
record, during the rendering of the plurality of corresponding adjacent frames by the device of the particular type, a plurality of corresponding timestamps; and
determine, based on the plurality of corresponding time stamps, the plurality of time measurements.

18. The non-transitory computer-readable medium of claim 14, wherein the processor-executable instructions further cause the processor to obtain the plurality of time measurements by at least being configured to:
cause the device of the particular type to execute a testing application, wherein the testing application causes the device of the particular type to render the plurality of corresponding adjacent frames and to operate at a threshold workload while rendering the plurality of corresponding adjacent frames;
record, during the rendering of the plurality of corresponding adjacent frames by the device of the particular type, a plurality of corresponding timestamps; and
determine, based on the plurality of corresponding time stamps, the plurality of time measurements.

* * * * *